Feb. 21, 1933.  G. W. METAVALLAS  1,898,017
UNIVERSAL KEYLESS COMBINATION LOCK
Filed Dec. 8, 1931  3 Sheets-Sheet 1

LEFT TURN
RIGHT TURN
HORN
COIL
BATTERY

Inventor
George W. Metavallas
By Liverance and
Van Antwerp
Attorneys

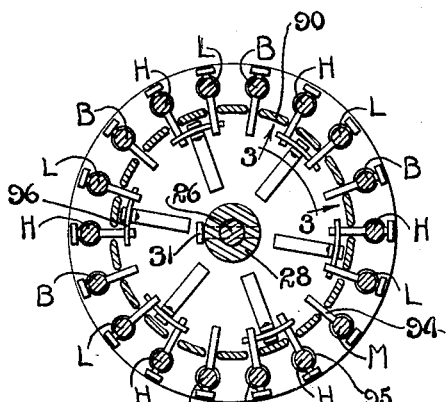
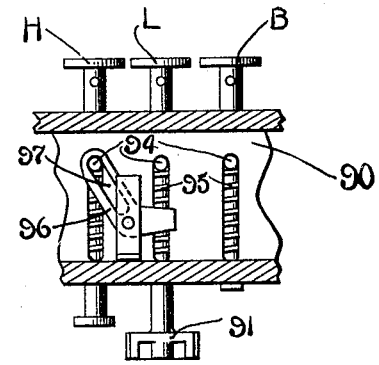
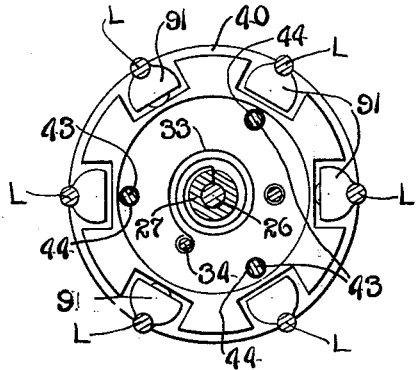
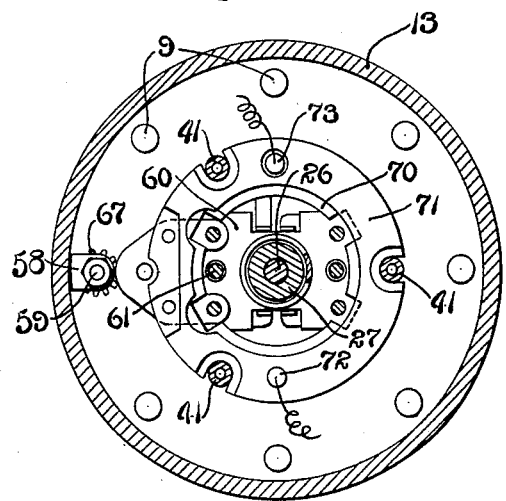
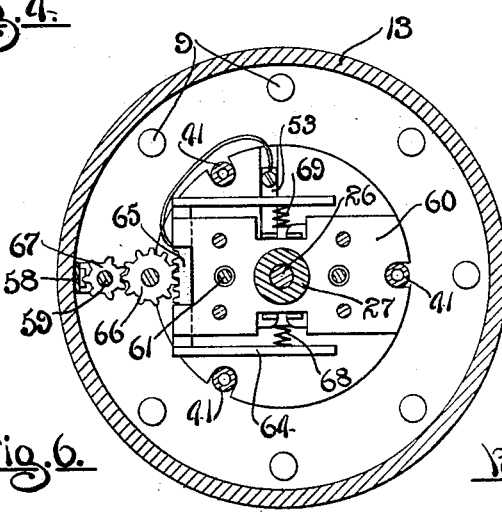

Feb. 21, 1933.　　　G. W. METAVALLAS　　　1,898,017
UNIVERSAL KEYLESS COMBINATION LOCK
Filed Dec. 8, 1931　　　3 Sheets-Sheet 3
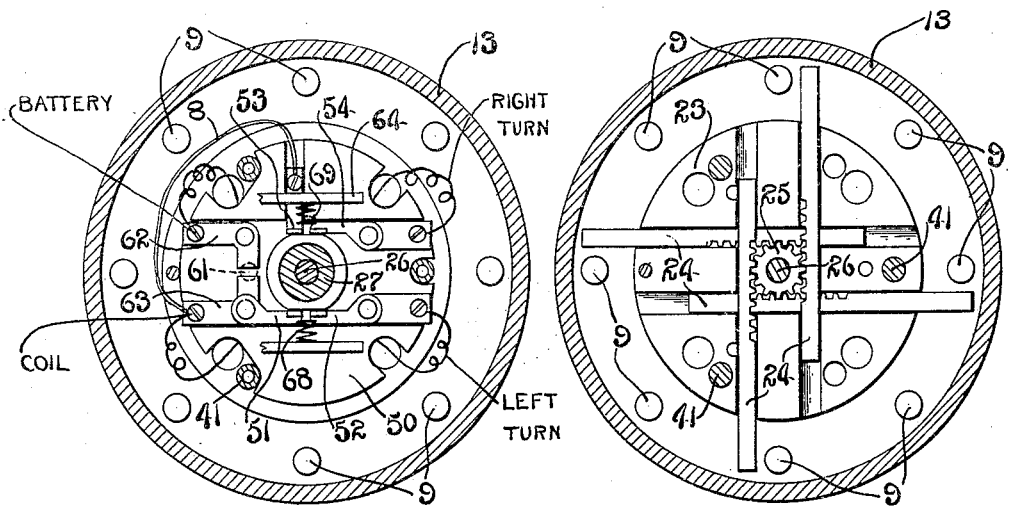
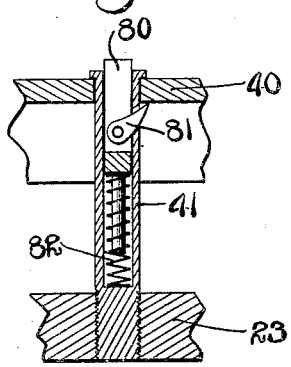
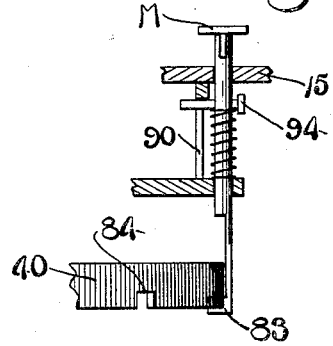
Inventor
George W. Metavallas
By Livrance and
Van Antwerp
Attorneys Patented Feb. 21, 1933

1,898,017

UNITED STATES PATENT OFFICE

GEORGE W. METAVALLAS, OF MUSKEGON HEIGHTS, MICHIGAN, ASSIGNOR OF ONE-HALF TO LE ROY A. KRIER, OF MUSKEGON HEIGHTS, MICHIGAN

UNIVERSAL KEYLESS COMBINATION LOCK

Application filed December 8, 1931. Serial No. 579,710.

This invention relates generally to a locking means and more specifically to a locking unit adapted to be applied to the steering column of an automobile whereby the steering wheel may be locked against unauthorized turning or use.

One of the primary objects of my invention is to construct a locking unit which will prevent rotation of the steering wheel and hence preclude the possibility of a thief driving away with the automobile. Also, the locking unit is so arranged as to break the electrical circuit leading to the coil of the automobile, this coil furnishing the spark for the engine, when the device is in locked position and hence no operation of the engine can be had at this time. Furthermore, I dispense with the usual key and provide a series of control plungers therefor.

Certain combinations of these plungers permit the operation of the releasing mechanism of the unit. It is also to be noted that any attempted manipulation of the plungers by one not familiar with the combination will cause an alarm to be given, such as the sounding of the automobile horn.

Still another feature concerned in my invention is the electrical circuit leading from the right and left turn signal lights, these signal lights being properly controlled by movement of the steering wheel housing, this electrical connection being broken when the steering wheel housing is in its locked position as the same will probably be turned so that the front wheels of the automobile are at an angle to the body of the car and thus, if the electrical circuit is not broken, one or the other of the signal lights would be in operation, such, obviously, being undesirable.

Further objects and advantages of my device will be apparent as the description proceeds.

Referring to the drawings:—

Fig. 2 is a horizontal section, this view being taken along the line 2—2 of Fig. 1.

Fig. 3 is a view taken along the line 3—3 of Fig. 2, this view showing the mounting of the control plungers.

Fig. 4 is a view taken along the line 4—4 of Fig. 1.

Fig. 5 is taken along the line 5—5 of Fig. 1, this view particularly illustrating the energized alarm ring whereby the horn is sounded when the combination of plungers is wrongly operated.

Fig. 6 is a view taken along the line 6—6 of Fig. 1, this view particularly disclosing the contact fork whereby proper operation of the right and left signal lights is had.

Figure 1:
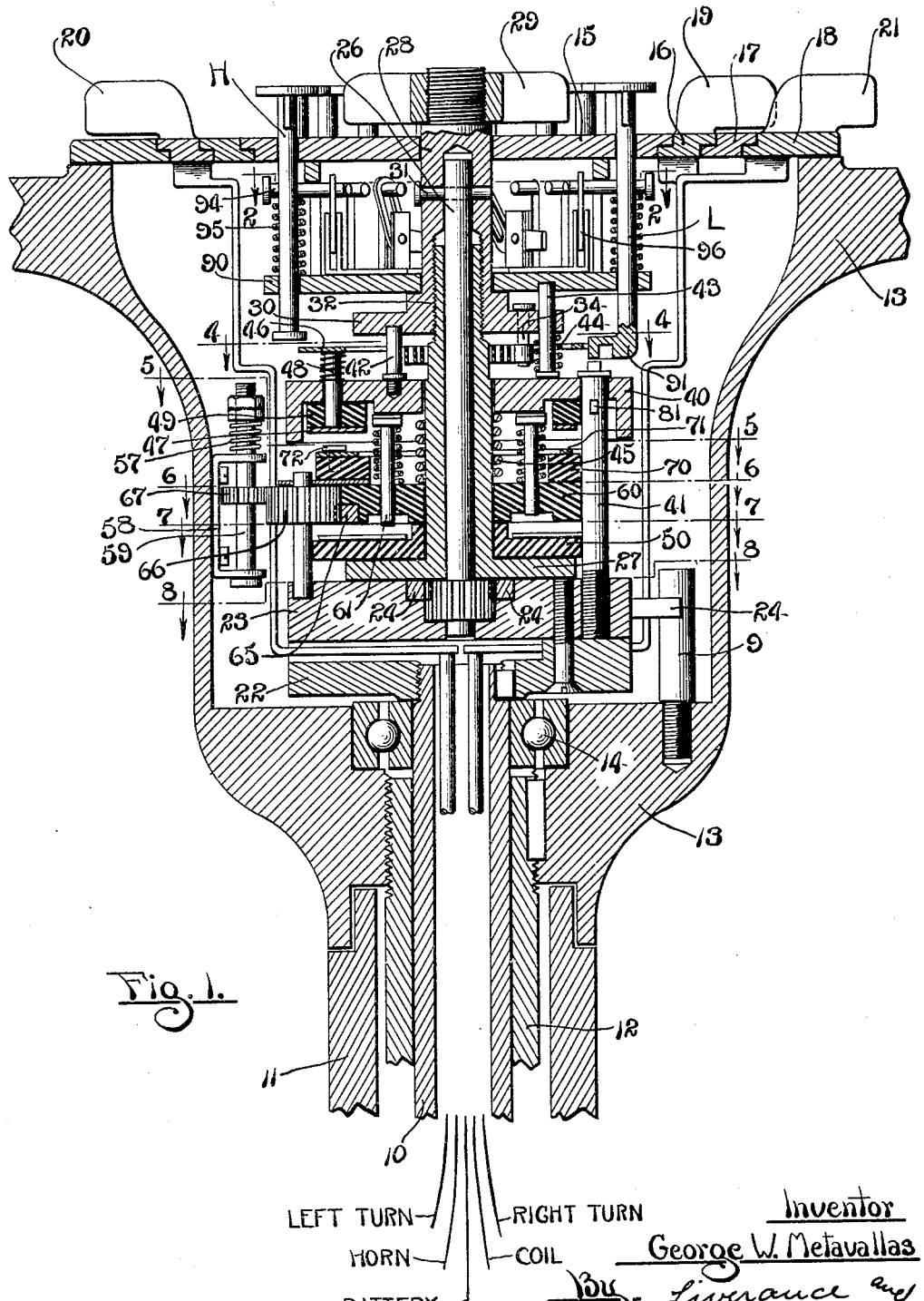
Fig. 1 is a view in cross section through the upper end of a steering column equipped with my improved locking mechanism.

Fig. 7, this view being taken along line 7—7 of Fig. 1, discloses the electrical connections controlled by the movement of the sliding disc.

Fig. 8 is a view taken along the line 8—8 of Fig. 1, this disclosure showing the balanced rack structure.

Fig. 9 is a longitudinal cross sectional view through the sliding disc guide pins.

Fig. 10 is a broken away view showing the master control plunger.

Similar numerals refer to similar parts throughout the several views.

Referring to Fig. 1, numeral 10 indicates the steering rod post and numeral 11 the steering rod housing, these members being stationary and supporting a steering rod 12, having a housing 13 threaded thereon, in revoluble relationship thereto. A bearing 14 is located between the housing 13 and the steering rod post 10 as clearly shown in Fig. 1.

A top plate 15, together with the control rings 16, 17 and 18, covers the top of the housing. The rings 16, 17 and 18 have finger lugs 19, 20, and 21, respectively, for the control of the spark, gas and lights, respectively. The control rods extend downwardly through the hollow steering rod post 10 as is clearly shown.

The steering rod post also carries the electrical conductors for the several circuits as is diagrammatically indicated at the bottom of Fig. 1.

A plate 22 is threaded onto the top end of the steering rod post and a rack guiding plate 23 is rigidly attached thereto by means of flat headed machine screws, only one of these being shown.

Referring now to Fig. 8, the plate 23 is grooved to carry the several reciprocating racks 24 and a pinion 25, fixed to the pinion shaft 26, extends upwardly interiorly of the bearing sleeve 27 and a member 28 has a control knob 29 threaded onto its upper end and a control disc 30 extending outwardly from its lower end.

The manual control knob 29 is located above the top plate 15 as is clearly shown in Fig. 1 and the pinion shaft 26 is held interiorly of the member 28 by means of the pin 31. The member 28 is threaded about the upper end of the bearing sleeve 27 as indicated at 32 and thus not only may these members revolve with respect to each other but vertical adjustment may also be had therebetween.

Referring now to Fig. 4, 33 indicates a coil spring, one end of this spring being fastened to the spring holding pin 34, rigid with the control disc 30, while the other end of the spring 33 is connected to the bearing sleeve 27. The sleeve 27 is held stationary and does not rotate.

The sliding disc mechanism

The sliding disc 40, see Figs. 1 and 4, is slidably mounted upon the three guide pins 41, these guide pins being threaded on the rack guiding plate 23 and thus being stationary. If desired, these guide pins might be mounted upon the radially extending portion of the sleeve member 27 if such was slightly extended in order that there would be no danger of the pins interfering with the sliding rack member 24. As shown in Fig. 8, the three pins 41 are equidistantly spaced from each other but it is to be appreciated that the three pins can be arranged as desired in any of the six holes shown and thus different combinations obtained. The sliding disc 40 is adapted for vertical movement as will later be set forth.

Detent pins 42 extend upwardly from the sliding disc 40 and are adapted to engage in shallow holes in the lower face of the control disc 30. See Fig. 1. A spacing pin 43, urged downwardly by the spring 44, extends through the control disc 30 and abuts against the sliding disc 40 and the upper ends of these pins extend into openings in the lower face of the shell support 90 to prevent rotation of the same with respect to the shell 90 when the unit is in its locked position and thus keep the combination of the plungers and the several pins 41 the same.

A large spring 45 encircles the pinion shaft bearing sleeve 27 and urges the sliding disc 40 upwardly at all times.

The sliding disc provides a support for the sliding horn alarm structure, this structure consisting of an upper ring 46, a lower ring 47 and connecting pins 48, these connecting pins extending through holes in the sliding disc 40 as is clearly shown in Fig. 1. An insulating ring 49 is located immediately below the sliding disc 40.

The electrical control

Referring particularly to Figs. 1, 5, 6 and 7, 50 indicates a fiber disc, and 60 a fiber block thereabove. Numeral 70 indicates a fiber ring mounted upon the block 60, the ring 70 supporting a ring 71, this ring, see Fig. 5, having contacts 72 and 73 therein, these contacts being connected by the conductor ring 47 whenever the same is depressed by one unfamiliar with the combination of the plungers attempting to operate the same.

The fiber block 60 has holes therethrough for slidably receiving the pins 61 and the left hand pin 61, referring to Figs. 1 and 7, contacts with the conducting members 62 and 63 and permits electricity to flow from one to the other. That is, when the pin 61 is pushed downwardly from its position as shown in Fig. 1, it abuts against the battery terminal and the coil terminal and thus the coil terminal is energized. The members 62 and 63 are mounted upon the fiber disc 50.

The block 60 also supports the contact fork 64, see Fig. 6, this contact fork having a toothed portion 65 engaged with the pinion 66, this pinion being in mesh with the small pinion 67. The pinion 67 is mounted on a shaft 59 revolubly mounted in a bracket 58. A spring 57, see Fig. 1, tends to prevent rotation of the shaft 59 and hence causes turning of the pinion 66 when tangential contact is had between the pinions. The spring 57 allows for slippage between the pinions, such being necessary when more than a complete rotation of the wheel is had. Thus, when the housing is rotated, the pinion 67 revolves the pinion 66 which in turn moves the contact fork 64 and thus the proper turn light is operated.

Contact points 68 and 69, mounted upon the fork 64, are adapted to bridge the terminals 51 and 52, 53 and 54, respectively, and thus energize with the left or right signal lights, these being located wherever desired.

The control plungers

Referring particularly to Figs. 1, 2, 3, 9 and 10, numeral 90 indicates a shell support which is fastened to and rigid with the top plate 15 and which supports a plurality of plungers, 18 in number as shown but obviously any chosen number may be used.

Five of these plungers, designated by the letter B, are blank or blind plungers and serve no mechanical purpose, their use being merely to confuse one who is attempting to make unauthorized use of the car.

Character H indicates six plungers, these plungers being adapted to engage the ring 46 of the horn operating ring and thus cause an electrical circuit to be completed between the contacts 72 and 73 and thus sound an alarm.

Character L indicates the depressing plungers, there being six of these, and these plungers have a lower head member 91 which engages against the upper end of the plungers 80, these plungers being slidably mounted in the guide pins 41. See Fig. 9. A pawl 81 is pivotally connected to the forked upper end of the plunger 80 and a spring 82 maintains the pawl against the underside of the sliding disc 40 to prevent its downward movement.

Referring now to Fig. 10, M indicates the master control plunger, this plunger having a tongue 83 adapted to be received in one of the several slots 84 cut in the outer flange of the sliding disc 40 whereby the sliding disc is prevented from having movement relative to the shell support 90 when the unit is in unlocked position.

Pins 94 extend through the several plungers and ride in slots in the support as clearly shown in Fig. 3, thus governing the extent of movement upwardly. Springs 95 urge the plungers upwardly. Levers 96, slotted as indicated at 97, see Fig. 3, receive the pins 94 of the horn plungers and the opposite end of the lever 96 extends under the pin 94 in one of the adjacent control plungers. Thus the adjacent plungers cannot be depressed at the same time.

The operation

As shown in Fig. 1, the sliding disc 40 is located at the top of the guide pins 41 and when in this position the detent pin 42, extending upwardly therefrom, sets into the shallow hole in the bottom of the control disc 30 and hence prevents any rotation of the control disc 30 and thus the pinion shaft 26 cannot be rotated by manually turning the knob 29. As shown in Fig. 1, the pinion shaft is so situated as to maintain the several rack bars in their outward position, see Fig. 8, and thus the rack bars engage with the pins 9, threaded into the housing member 13, and thus movement between the steering wheel housing and the fixed supporting structure is prevented. Thus the steering wheel of the automobile cannot be turned.

When the plate 40, as aforesaid, is at the top of its guide pins, the pin 61 is forced upwardly by means of the spring located thereabout and hence, see Fig. 7, the pin 61 does not engage the members 62 and 63 at its lower end and thus the electrical circuits between the battery and the coil is broken. Also, the electrical circuit which leads to the right and left hand rear signal light is also broken as such flows from the member 62 to the member 63 and then through the members 51 and 52 to the left hand light and through the conductors 8, member 53 and member 54 to the right hand rear signal light.

When it is desired to unlock the steering wheel, the proper combination of plungers is pushed downwardly and the plungers L have their lower ends 91 contact with the tops of the three plungers 80 and depress them so that the pawls 81 are withdrawn from underneath the sliding disc 40 as will be obvious from an inspection of Fig. 9. The additional movement of the plungers L causes the plate 40 to be depressed and this causes the detent pin 42 to release the control disc 30 and the coiled spring 33 immediately becomes effective to rotate the disc 30 through about 180°, and in this position the top of the pin 42 rides against the lower face of the disc 30 and holds the sliding disc in its lower position, thus maintaining the pin 61 in contact with the electrical conducting members 62 and 63 and this rotative movement also causes the pinion 25 to withdraw the several racks from engagement with their pins 9 and thus the steering wheel is released.

After the plate 40 is depressed, the steering wheel housing is free to turn and hence the gear segment 67, when such turning movement occurs, will rotate the pinion 66 and this in turn bodily translates the contact fork 64 so that either the contact springs 68 or 69 become effective to operate either the right or the left hand rear light signal in a manner well understood by those skilled in this art.

When the sliding disc 40 is in its lower position, the master control plunger M is engaged as shown in Fig. 10, and thus relative movement cannot occur between the several parts so as to throw the combination out of adjustment. It will be noted that there are six plungers designated by the character L, and that there are only three guide pins which contact therewith. Thus, it will be appreciated that the master plunger may be depressed and the combination changed when such is necessary.

Having thus revealed this invention, I claim as new and desire to secure the following combinations and elements, or equivalents thereof, by Letters Patent of the United States.

1. In combination, a steering wheel housing, means attached thereto, means to revolubly support said steering wheel housing, stationary means located inside of said housing, extensible means located on said stationary means and adapted to be moved outwardly into engagement with the said attached means by rotation of a shaft, said shaft being manually rotated by means of a control knob, a control disc rigid with said shaft, spring means connected between the stationary support and the control disc whereby the shaft is turned in one direction, a sliding disc adapted to slide axially of the said shaft, detent means between the sliding disc and the control disc to prevent rotative movement of these two members with respect to each other, and locking means adapted to prevent the sliding disc from moving axially.

2. A combination of elements as set forth in claim 1 in which the locking means consists of releasable members located in the path of the sliding disc and plunger means adapted to withdraw said locking means for the purpose described.

3. In combination, a revolubly mounted steering wheel housing, a stationary guiding plate located therein, rack bars slidably mounted in said guiding plate, means to move the rack bars in and out toward the housing whereby the same may be prevented from rotation as desired, said means consisting of a pinion engaging with the rack bars and a shaft extending upwardly from said pinion about centrally of the steering wheel housing, a control knob mounted upon the upper end of the shaft, said pinion shaft having a control disc extending radially therefrom, spring means for turning the control disc one direction, said control disc having a hole therein, a sliding disc adjacent the control disc, a detent pin rigid with said sliding disc and adapted to enter said hole in the control disc when the rack bars are in their extended position, and means for moving the sliding disc axially to relieve the control disc.

4. In a locking mechanism for the steering wheel of an automobile, the combination of, a steering wheel housing, including rigid means, revolubly mounted upon a stationary support, said support supporting the locking mechanism, said locking mechanism consisting of a guide plate, extensible means mounted in said guide plate, said extensible means engaging with said rigid means to prevent rotation thereon, manually operated means for urging said extensible means to its engaged locking position, spring means for causing the extensible means to assume its unlocked position, detent means for maintaining said extensible means in its operative position and means for manually releasing said detent means.

5. In a device of the class described, a rigid steering rod post, a steering wheel housing revolubly mounted thereon, locking means mounted upon said steering rod post, said locking means including an outwardly movable rack bar, a pinion meshing therewith, a pinion shaft for said pinion, a bearing sleeve for said pinion shaft, and a pin on the steering wheel housing extending into the path of movement of said rack bar, whereby relative movement between the steering wheel housing and the steering rod post is prevented, a sliding disc mounted upon the pinion shaft bearing sleeve, a detent pin rigid with said disc for preventing rotation of said pinion shaft and means for releasing said detent pin by sliding said sliding disc axially of the said pinion shaft.

6. In combination, a steering rod post, a steering rod revolubly mounted on said post, a steering rod housing fixed to said steering rod and having a steering wheel attached thereto, locking means mounted upon said steering rod post, means on the steering wheel housing cooperatively associated with said locking means whereby the steering wheel housing is held from rotative movement, and control means revolubly mounted upon the said locking means for the purpose described.

7. In a steering wheel locking mechanism, the combination of, a stationary post, a steering rod revolubly mounted thereon, a housing rigidly attached to said steering rod and extending upwardly to form a steering wheel, a locking mechanism mounted upon said steering wheel post interiorly of the housing, and means actuated by said locking mechanism for preventing rotative movement of the steering wheel housing.

8. In a locking mechanism of the class described, a steering rod post, a steering wheel housing revolubly mounted upon said post, a rack guiding plate mounted upon said steering rod post, a rack mounted in said plate, means extending from said steering wheel housing into the path of the said rack, and means adapted to move the rack outwardly whereby it extends into the path of said means to prevent movement between the housing and the post.

9. In an automobile steering mechanism having a rigid steering post and a steering wheel housing revolubly mounted thereon, the combination of, a rack supporting plate rigidly mounted upon said steering rod post, a rack slidably mounted in said rack supporting plate, said rack being adapted to prevent rotation of the steering wheel housing when in its outer position, means to move the said rack, spring means to maintain the rack in one of its extreme positions, and plunger means adapted to release said rack from this said position.

10. In an automobile steering wheel locking device the combination of, a steering wheel mounting, pins thereon, and means to prevent rotation thereof, said means including a stationary support, a rack bar slidably mounted in said support, means to reciprocate said rack bar so that it may be engaged with the said pins on the steering wheel housing in order to prevent rotation of the same, locking means for preventing operation at the rack bar operating means, said locking means including a control disc urged in one direction by a spring and means for manually operating said control disc in the other direction.

11. In a locking mechanism of the class described, a shell support, a plurality of plungers slidably mounted therein, a disc adapted to be acted upon by the reciprocation of said plungers, and adjustable locking means between the shell support and the disc whereby they may be adjusted relatively to each other.

In testimony whereof I affix my signature.

GEORGE W. METAVALLAS.